Dec. 2, 1969          A. GRAHAM ET AL          3,481,455
FREE-FLOWING PACKING MATERIAL OF LOW BULK DENSITY

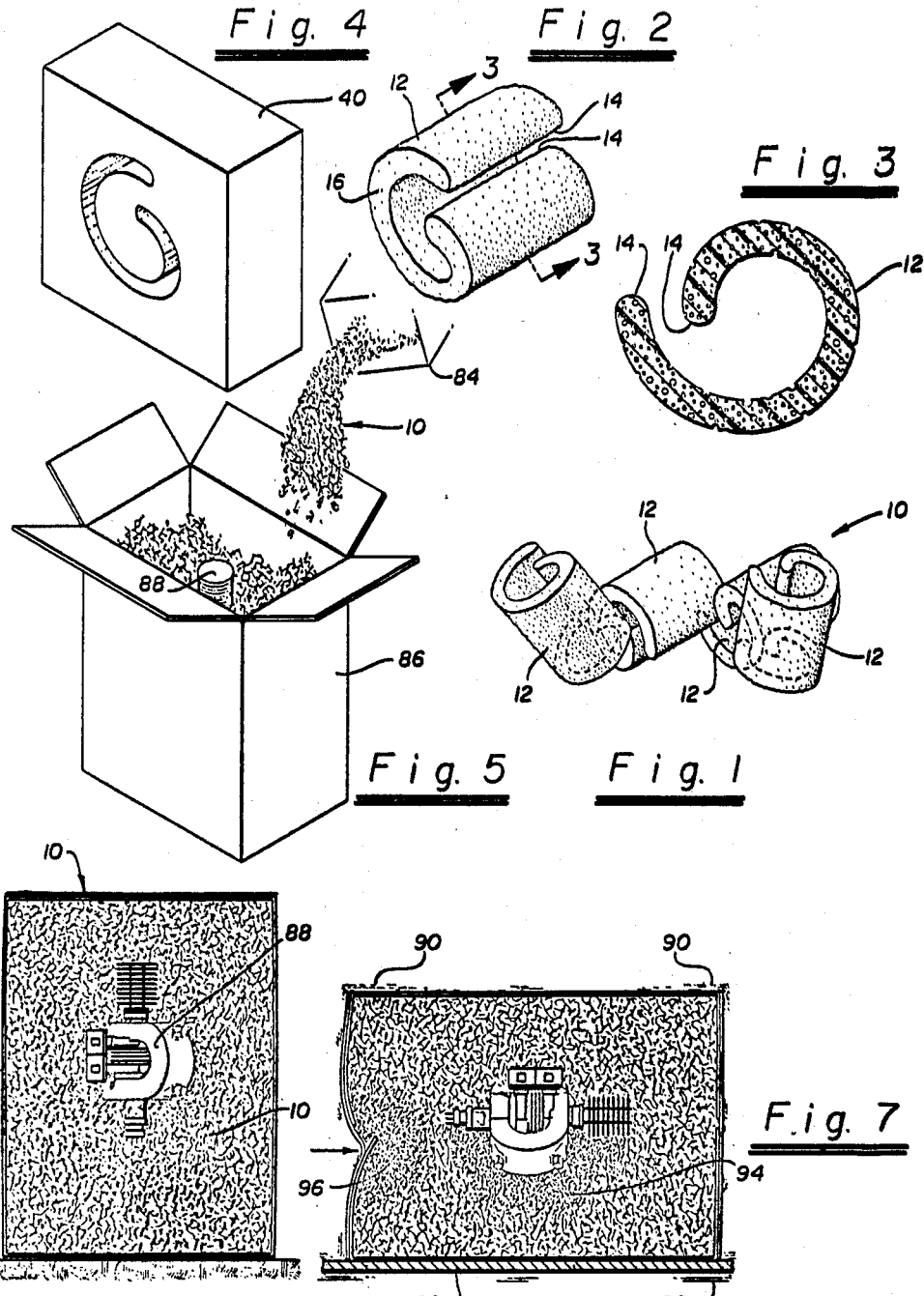

Filed Oct. 10, 1968                              4 Sheets-Sheet 3

INVENTORS
Arthur Graham
Lorne R. Stanley
BY
Attorneys

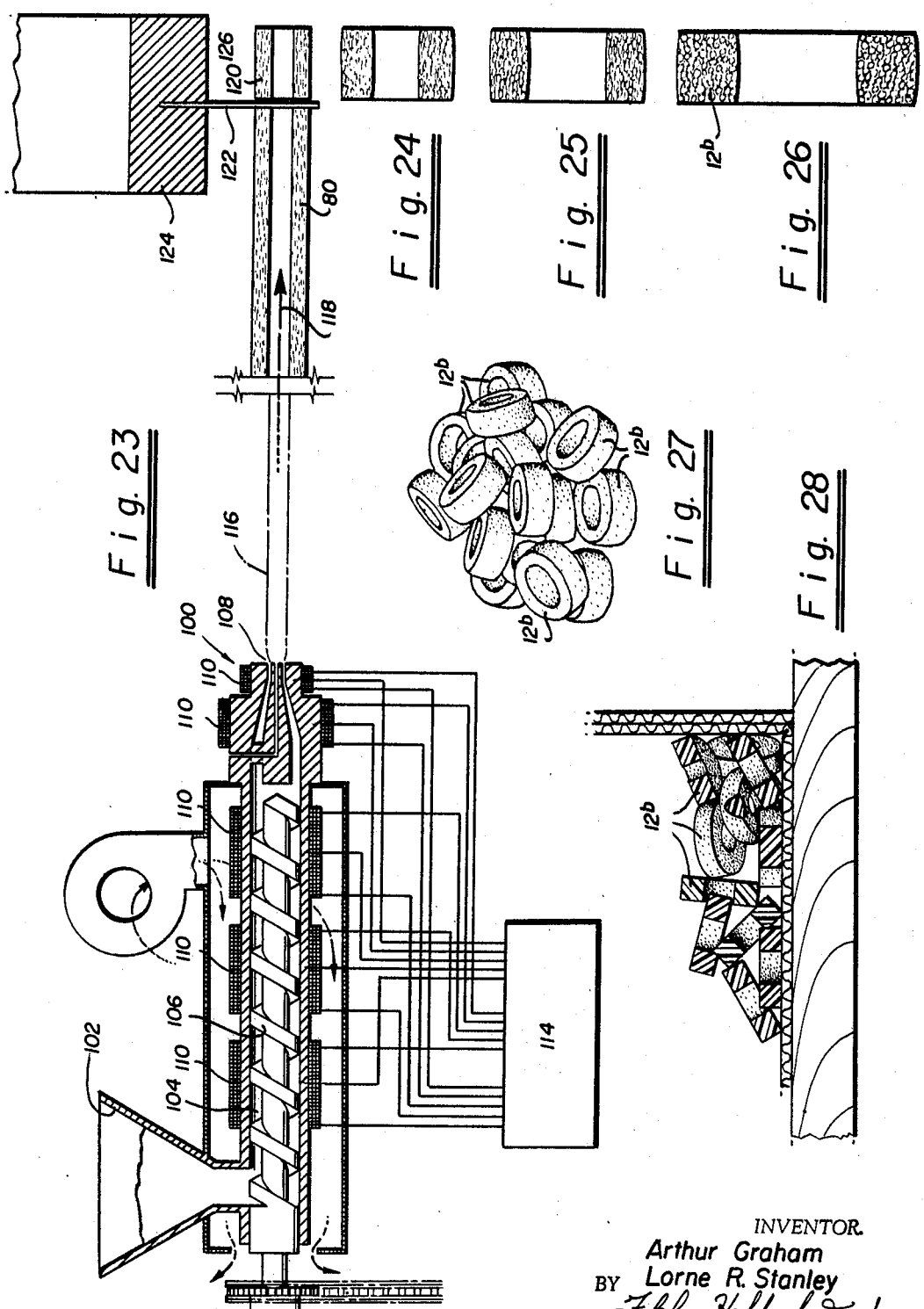

United States Patent Office 3,481,455
Patented Dec. 2, 1969

3,481,455
FREE-FLOWING PACKING MATERIAL OF LOW BULK DENSITY
Arthur Graham, Palo Alto, and Lorne R. Stanley, San Mateo, Calif., assignors, by mesne assignments, to Free-Flow Packaging Corporation, Redwood City, Calif., a corporation of Delaware
Continuation-in-part of application Ser. No. 608,365, Jan. 10, 1967. This application Oct. 10, 1968, Ser. No. 766,440
Int. Cl. B65d 85/00; B29c 17/14; B29h 7/20
U.S. Cl. 206—46
19 Claims

ABSTRACT OF THE DISCLOSURE

A free flowing packing material (and method for its manufacture) in the form of a plurality of substantially hollow shape-retaining crushable cylinders or annuli made of a formed expanded crushable plastic material. The individual units are of a size and shape to permit the free flowing characteristic. The individual units are also formed to insure that a mass of the units will have the ability to crush and absorb shock, both through collapse or crushing of the substantially hollow cylindrical unit shapes and crushing or collapse of the foamed expanded plastic materials from which the units are made.

Cross-reference to related application

This application is continuation-in-part of copending application Ser. No. 608,365, filed Jan. 10, 1967 now abandoned, by the applicants Arthur Graham and Lorne R. Stanley, and titled Free Flowing Packing Material of Low Bulk Density.

Background of invention

This invention relates generally to the storage and shipment of frangible items of merchandise, and more particularly to an improved free flowing packing material made of foamed, expanded plastic material.

As is well known, conventional procedures for packing fragile or breakable items are not always successful in preventing damage, even where carried out by professional shippers or packers. It has been found impossible, for example, to eliminate breakage due to rough handling of the shipping cartons, road shocks, impacts, and the like. Packing procedures and materials have also been unable to prevent "migration" during periods of prolonged shipment, a serious problem in the handling of fragile equipment. As an illustration, shipments of such items as electronic or optical equipment in vans or rail cars are normally accompanied by periods of prolonged or continuous vibration, resulting in migration of the packed item until, frequently, contact is made with the wall of the shipping carton and breakage occurs. Breakage from this and other normal causes customarily runs as high as 15 percent, and may be considerably higher where prolonged periods of shipment are involved.

Summary of invention and objects

In general, the present invention is based on our discovery that the desired characteristics of free-flow packing materials as generally disclosed in United States Patent 3,074,543 can be improved particularly with regard to shock absorbing characteristics, when the material is formed of a foamed and expanded plastic material. More specifically, we have found that a mass of the substantially hollow crushable cylinders, formed of the foamed expanded plastic material, not only will retain the characteristics of crushability inherent in the hollow, cylindrical shape, but can additionally be made to possess a degree of crushability related to the expanded foam which will greatly enhance the characteristic ability of the packing material to absorb shock, vibration and impact. In use, individual units of the improved packing material will retain the desired open cylindrical shape during all normal handling. However, in response to a force or impact of normally destructive or damaging magnitude, the units undergo a substantial localized deformation which serves to absorb the impact and shock in a new and improved way. This improved shock absorption results from a dual capability of the individual cylinders to function both as crushable or deformable "shapes" and as a crushable or deformable "material." The packing material deforms as a "shape" when the open hollow cylindrical units collapse or deform inwardly upon themselves to assume a deformed or partially deformed configuration. The packing material deforms as a "material" when the expanded foam collapses and deforms internally (i.e., within the walls of the individual units) to further absorb the shock.

A mass of the tiny collapsible, expanded foam cylinders, described above, additionally posses a characteristic of "flowability" which permits the mass to be poured into recesses and openings of oddly shaped items, and within the confines of a shipping carton, to isolate a packed item from the sides of the carton. Such pouring or filling operation can be performed rapidly and efficiently, with automatic machinery or by means of unskilled hand labor. Production line packing techniques are thereby facilitated. Once packed, the item is protected from the damaging forces of shocks and impacts of the type normally experienced in shipments by rail, truck or air. The improved packing material additionally possesses the advantageous characteristics of relatively low bulk density, resistance to moisture, rot and vermin, and a degree of resistance to chemical deterioration, not found in packing materials customarily employed.

It is an object of the present invention, therefore, to provide a loose, pourable packing material made of a foamed expanded plastic material, which is easy to handle and which greatly reduces breakage problems.

Another object of the invention is to provide foamed expanded plastic packing material of the type described which will absorb rather than transmit the forces of vibration, shock or impact.

Another object of the invention is to make available a foamed expanded plastic packing material which is inexpensive and relatively easy to manufacture, and which is readily adapted to machine-type production-line packing techniques.

Another object of the invention is to provide a shipping carton for frangible items, filled with a free-flow packing material of the type described, that will serve to protect an item packed within the container, under even the roughest of handling.

A still further object of the invention is to provide a novel method for the manufacture of a foamed and expanded, free-flow packing material of the type described.

A still further object of the invention is to provide a foamed and expanded, free-flow packing material of the type described, in a novel annular or ring-like configuration.

Additional objects and advantages of the present invention will appear from the following description in which preferred embodiments have been set forth in detail in conjunction with the accompanying drawing.

Brief description of the drawing

FIGURE 1 is a view in perspective of a quantity of packing material embodying the invention;

FIGURE 2 is a like view on an enlarged scale, illustrating an individual unit of packing material as shown in FIGURE 1;

FIGURE 3 is an enlarged sectional view along the lines 3—3 of FIGURE 2;

FIGURE 4 is a perspective view of an extrusion die useful in producing packing materials of the type illustrated in FIGURES 1 to 3;

FIGURE 5 is a view in perspective illustrating a carton packing operation in accordance with the invention;

FIGURE 6 is a view in vertical section showing the use of the packing material of the invention in a carton that has been sealed for shipment or storage;

FIGURE 7 is a like view showing the manner in which a sharp blow or shock is absorbed by the packing material;

FIGURE 23 is a schematic view in vertical section, illustrating another method of making foamed expanded plastic materials in accordance with the invention;

FIGURES 24, 25 and 26 are sectional views of packing units, as produced in FIGURE 23, showing further stages in the formation of the same;

FIGURE 27 is a view in perspective of a quantity of the packing units, produced by the method of FIGURES 23 through 26;

FIGURE 28 is a detailed sectional view, through the corner of a shipping carton, illustrating a particular feature of the units of packing material as produced in FIGURES 23 through 26.

Description of preferred embodiments

Figure 8:
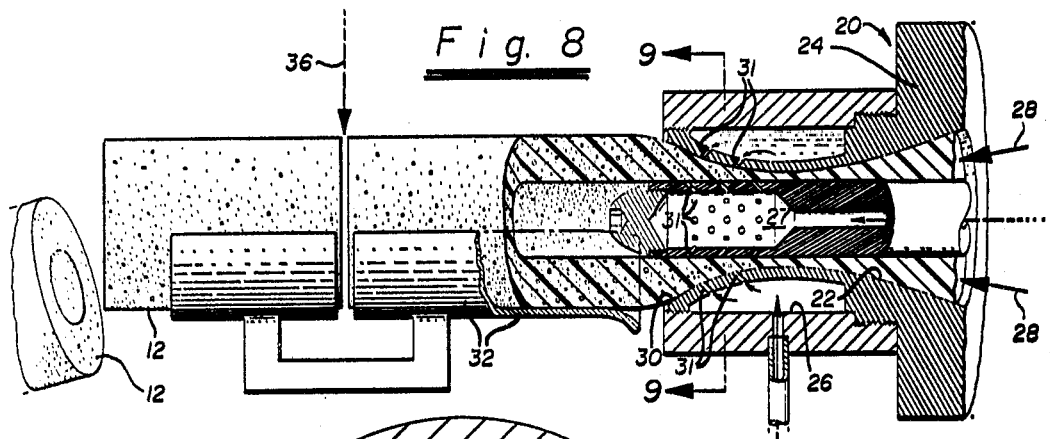
FIGURE 8 is a view in vertical section illustrating one method of making foamed expanded plastic packing material in accordance with the invention.

Referring to the drawings in detail, FIGURE 1 illustrates a quantity of the improved packing material arranged in a characteristic loose random mass 10. This mass comprises a multiplicity of small open or substantially hollow cylinders 12 of relatively short length. It will be understood that the term "cylinders" is used herein in the broad dictionary sense (see Webster's 3d International Dictionary). In the embodiment illustrated in FIGURES 1 to 3, the cylinders 12 take the form of open hollow bodies having substantially parallel edges 14. As will hereinafter be explained, the edges 14 and ends 16 of the packing units permit a degree of interlocking of adjacent units of the packing mass to provide a relatively firm cushioning support. In the embodiment illustrated in FIGURES 26, 27 and 28, the cylinders take the form of open hollow annuli or ring-like bodies having a characteristic "lifesaver" form. As will hereinafter be explained, the relatively large internal diameter of these annular packing units permits a degree of interlocking of adjacent units within a packing mass to provide a relatively firm cushioning support. A certain amount of interlocking is beneficial since it prevents migration of relatively heavy items through the packing mass in response to continued or excessive vibration.

In accordance with the present invention, the packing units 12 are formed of a foamed expanded plastic of sufficient internal strength to retain the characteristics of a rigid foam during normal handling, but which undergoes deformation and some crushing in response to damaging shocks or continued vibration. In preferred embodiments, the foam is characterized by an essentially cellular structure (unicellular or interconnecting) having a volume of cells or void spaces ranging from about 25% to as much as 85% of the total volume of the units. This highly porous foam structure, coupled with an appropriate selection of the resin used to make the expanded plastic foam, is important to applicants' invention because it mates the qualities of initial stiffness and resilience to the characteristic crushability to thereby render the foamed plastic material ideal for use as a cushioning or packing material. More specifically, the degree of void space in the expanded foam imparts a latent crushability or shock absorbing characteristic to interior portions of plastic material itself. This quality of crushability is additive in the sense that it supplements the inherent ability to deform or crush incorporated into the hollow shape or cross section of the packing units, which likewise possess an initial tendency to remain in an uncollapsed condition or shape. As noted previously, the open ended or hollow configuration of the packing units allows air to be expelled from either end so that additional crushing may occur.

Expanded plastic foams particularly suited for use in the present invention include both thermoplastic and thermosetting resinous materials. Thermoplastic resins capable of being foamed and expanded include specifically the alkenyl, aromatic polymers as disclosed in United States Patent 3,066,382, and the aliphatic olefin polymers as disclosed in United States Patent 3,251,728. These thermoplastic materials (in either modified or unmodified form) are customarily employed in conjunction with suitable foaming and nucleating agents. Thermosetting resins adapted for use in the present invention include foamed polyester resins such as the polyurethane foams (i.e., derived from isocyanate resins) and specifically the more rigid polyurethane foams made from the relatively highly branched resins. Blowing or foaming agents are also advantageously used with the thermosetting resins. However, in the polymer-forming reactions with the polyurethane resins, foaming also occurs through reaction of water with the isocyanate groups to cause cross linking and curing and production of carbon dioxide so that reduced amounts of such agents may be required.

Regardless of the particular plastic material employed, it is essential in carrying out the present invention that the packing units 12, in their foamed expanded state, possess the desired cellular structure and the desired proportion of void spaces with respect to the total volume. Thus, as will appear, the formulation of the plastic materials should be very carefully controlled to provide foamed expanded plastics of desired essential characteristics, for example: to provide desired cell sizes (i.e., ranging from 0.001 to 0.1 inch); to provide a desired proportion of void spaces to the total volume (i.e., ranging from at least 25% to no more than 85%); to provide a desired foam density (i.e., ranging from about 0.3 to about 4.5 pounds per cubic foot); to provide desired characteristics of resilience or shape retention to both the foam structure and the cylindrically shaped units of packing material, under normal handling; to provide both the foam and units with the "crushability" necessary to absorb forces or impacts capable of damaging a packed item and to provide other essential characteristics as hereinafter specified.

Figure 9:
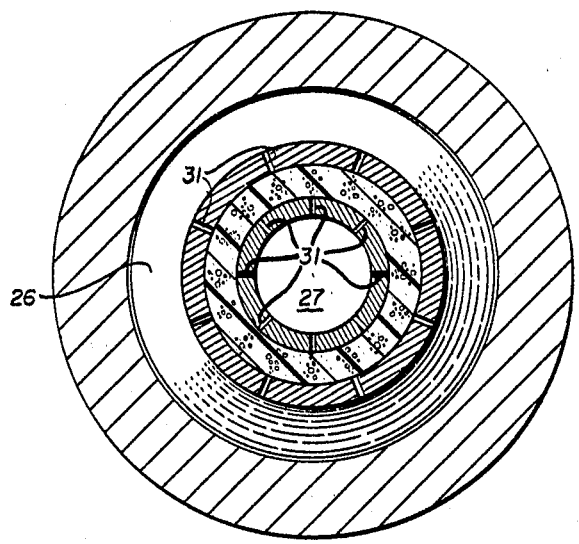
FIGURE 9 is a view in transverse section along the line 9—9 of FIGURE 8.

In one embodiment of the invention, the packing units 12 are extruded through an extrusion device which effects a simultaneous mechanical foaming and chemical expansion of an expandable thermoplastic extrusion mass. Such an extrusion device is illustrated in FIGURES 8 and 9 wherein the extruder head is represented at 20. Except as herein disclosed, the extruder head 20 may be used in conjunction with conventional extrusion apparatus including a hopper and feed chamber adapted to operate with an extruder screw or other pressure device which forces a liquid or heat softened plastic mixture through an annular passage 22 within the extruder head to the extrusion outlet 30. In this regard, suitable heating and/or cooling means may be employed to insure the desired degree of plasticity of the expandable plastic material being fed to the extrusion die.

As particularly illustrated in FIGURE 9, the extruder head 20 is formed with an inner core or die member 23 which cooperates with an annular die member 24 to form the extrusion outlet. The die member 24 additionally cooperates with an outer shell 25 to provide an annular chamber or plenum 26 for the introduction of hot or heated foaming gases (e.g., steam, carbon dioxide, nitrogen, etc.). The core 23 is similarly provided with an axial passage 27 for the same purpose. Assuming the feeding of a liquid or heat softened thermoplastic extrusion mixture to the extruder head 20 under pressure (arrows 28), the heating of the extrusion die members 23 and 24 by the hot gases (or by means of an external heat source) will initiate the expanding action of any expanding agents incorporated in the extrusion mix. Release of gas from the expanding agents is accelerated by introducing the hot gases directly into the extrusion outlet 30 by means of gas outlets or ports 31 provided in each of the plenum chambers 26 and 27.

Where pressurized steam is used, the action of the expanding agents is greatly accelerated so that the formation of a cellular structure due to chemical release of gas from the expanding agents rapidly takes place. At the same time the jets of steam or hot gas under pressure, contributes further to the development of a cellular structure within the mass being extruded, and also serves to form paths through the extruded material for the partial escape of gas. Advantageously, the introduction of heated gas through the extrusion die, and into the thermoplastic mass, effects a simultaneous expansion and foaming of the thermoplastic mass as generally indicated in FIGURE 9. The expanded mass is immediately received and supported within a troughlike structure 32 which chills the outer surface of the extruded mass and initiates a cooling and setting of the extruded mass into a rigid shape-retaining expanded foam. The described chilling operation may be accelerated by use of a cooling jacket (not shown) surrounding the trough structure 32. The foamed expanded mass leaves the extrusion die and moves through the trough 32 at a relatively rapid rate, thereby facilitating sizing and cutting operations with a cutter, represented by the arrow 36. It will be appreciated that the cutter is advantageously operated at timed intervals to sever the solidified extrusion mass, to form the packing units 12 hereinbefore described. If desired, suitable conveying means such as endless belts or like means may be employed to convey the extruded mass at a desired rate through the cutting operation.

Referring again to FIGURES 9 and 10, the illustrated extrusion die is provided with a specially designed die opening in the form of an annulus of gradually expanding cross section. This construction results in a gradual reduction in velocity of the plastic material as it flows through the die outlet, thereby assisting in the formation of the desired foam structure. The particular extrusion die illustrated in FIGURES 8 and 9 produces a foamed expanded plastic unit, illustrated at 12a in FIGURE 10, which has a generally tubular configuration. Extruded units of varying cross sectional configuration can be obtained by the use of extrusion dies of differing outlet configurations. For example, the extrusion die 40, illustrated in FIGURE 4, will produce a foamed expanded plastic unit as illustrated in FIGURES 1 to 3. Assuming similar extrusion conditions, the units 12 illustrated in FIGURES 1 to 3 will be similar in all respects to the unit 12a shown in FIGURE 10, except for cross sectional configuration.

FIGURES 13 to 17 illustrate further variations in the cross sectional configuration of the extruded plastic units 12, while FIGURES 18 to 22, respectively, illustrate corresponding variations in the extrusion dies to achieve the varied embodiments. In every case however, the extrusion die functions to produce a substantially open, hollow cylindrical configuration or shape which will have the inherent crushability hereinbefore described. Thus each of the illustrated units of packing material, identified as 12c, 13d, 12e, 12f, and 12g, has a cross sectional configuration which provides substantially open or hollow concavities 50 which impart a substantial degree of crushability related to or based on the shape of the units. As previously noted, the foamed expanded structure of the units provides an additional degree of crushability related to the foamed plastic material from which the units are formed. In addition to the described dual characteristics of crushability, each of the illustrated units possesses a desirable interlocking characteristic by virtue of the protruding arms or legs 52 which provide edges similar to the edges 14 on the units 12 (see FIGURE 2). In addition, certain of the units are provided with added projections or concavities which further contribute to the interlocking characteristics. Thus, the unit 12e (FIGURE 15) is provided with projections 54 and cooperating concavities 56 which further contribute to the interlocking function. The unit 12f (FIGURE 16) has concavities at 58 which achieve a similar effect.

Figures 10, 11, 12:
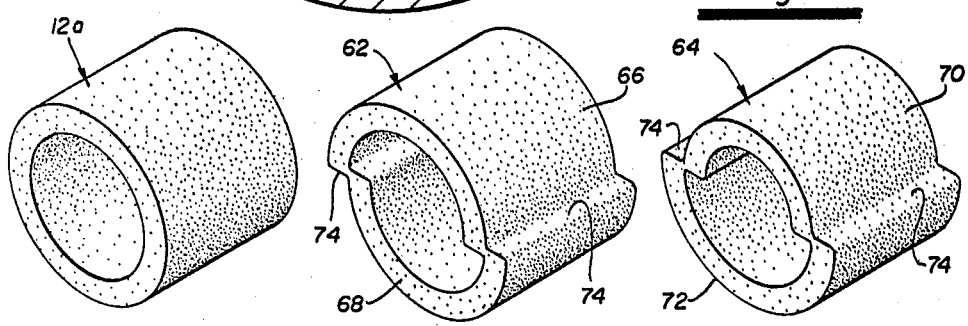
FIGURES 10 to 12 are views like FIGURE 2 illustrating further embodiments of packing material according to the invention.
Figure 18:
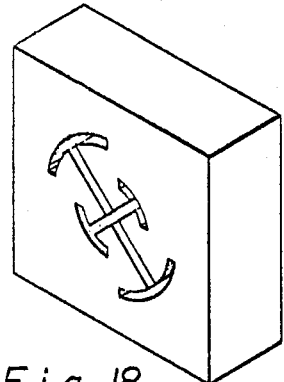
FIGURES 18 to 22 are prespective views of extrusion dies useful in making the units of packing material illustrated in FIGURES 12 to 16 respectively.
Figure 19:
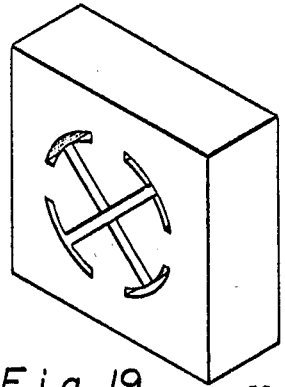
Figure 20:
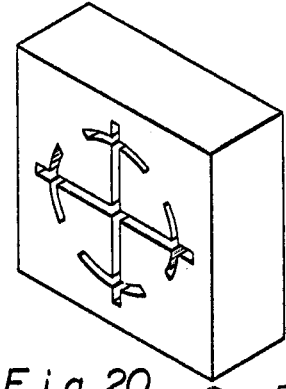
Figure 13:
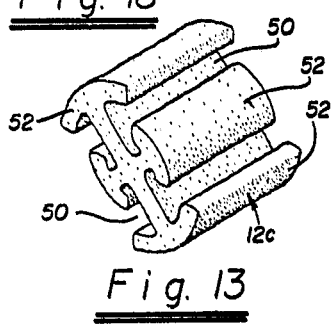
FIGURES 13 to 17 are views like FIGURE 2, illustrating still further embodiments of packing material in accordance with the invention.
Figure 14:
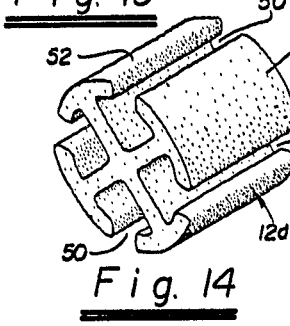
Figure 15:
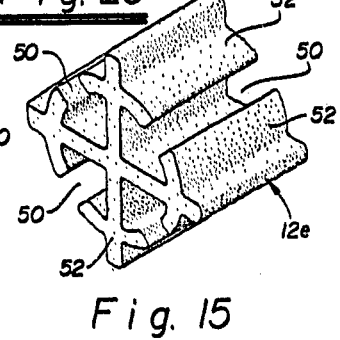
Figure 21:
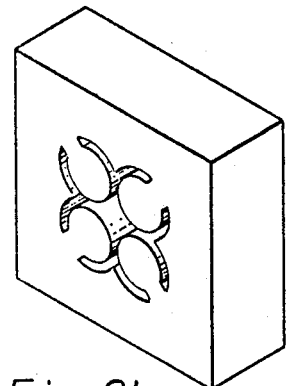
Figure 22:
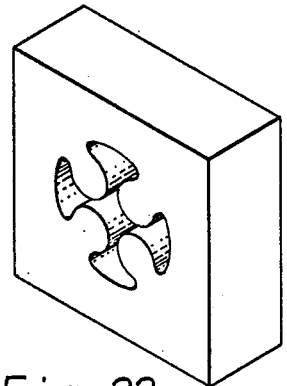
Figure 16:
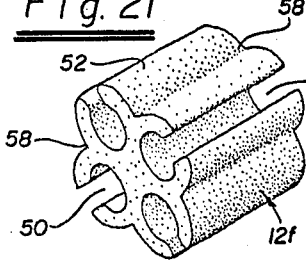
Figure 17:
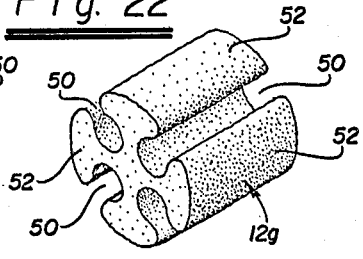

The foamed expanded packing units thus far described are easily formed by the extrusion technique generally disclosed with reference to FIGURES 8 and 9. Variations of this technique can also be used to produce offset configurations of the packing units, for example, as shown in FIGURES 11 and 12. As will be understood by one skilled in this art, semi-cylindrical components can be separately extruded and heat bonded to one another while still in the heat softened state to produce units of the type illustrated. Various other extrusion techniques might also be employed to produce particular configurations of the packing material, or to produce variously shaped units for particular packing purposes.

In a further particularly satisfactory method for producing the packing units embodying the present invention (specifically disclosed in copending application, Serial No. 765,083, filed Oct. 4, 1968, in the name of Alexander G. Makowski), elongate hollow tubes of foamed expanded plastic are continuously extruded from extrusion apparatus capable of effecting the necessary mixing, foaming and expansion of the entering extrusion mixture. Such extrusion apparatus is schematically illustrated in FIGURE 23 wherein an extruder head having a circular extrusion orifice is represented at 100. The extruder head 100 is illustrated in conjunction with conventional extrusion apparatus including a hopper 102 and plasticizing chamber 104, adapted to cooperate with an extruder screw 106 or other pressure device which forces molten or heat softened plastic material through an annular or circular extrusion orifice 108. Suitable heating and/or cooling means 110, 112 (thermostatically controlled by the unit 114) may be employed to insure the desired degree of plasticity of the expanded plastic material issuing from the extrusion orifice in the form of a hollow, foamed expanded plastic tube, represented by the dotted and full lines 116.

As particularly disclosed in the aforementioned copending application, Serial No. 765,083, the foamed expanded plastic tubes 116 issuing from the extrusion apparatus quickly cool in the surrounding ambient atmosphere. When the foamed extruded tubes 116 are formed from thermoplastict resins, such cooling will harden the tubes 116 to a set stage so that they may be frictionally engaged and pulled away from the extrusion apparatus (arrow 118) at a rate appreciably faster than the heat softened plastic material is extruded through the extrusion head 100. The effect is to longitudinally stretch the heat softened material issuing from the extrusion nozzle to longitudinally orient gas pockets and void spaces (represented at 120 in FIGURE 23) produced by foaming agents normally employed in the extrusion processing. Thereafter the stretched, partially expanded tube is subjected to cutting and sizing operations, for example by means of a rotary cutter 122 carried by a flywheel 124. It will be appreciated that the cutter is advantageously operated at timed intervals to sever the cooled expanded tubes 116 into relatively short units 126. Because of the longitudinal orientation of the individual gas pockets and void spaces 120 in these units (hereinafter referred to as "cells"), the units possess an expansion capability upon subsequent heating of the thermoplastic material which is substantially greater in a radial direction than along the axes of the individual tubular units.

In practice, when the short tubular units 126 are formed of thermoplastic resin, the units can be successively expanded to a fully distended state of the individual cells 120, as schematically represented by the successive expansions of the units illustrated in FIGURES 24, 25 and 26. Thus, FIGURE 24 illustrates a first stage expansion of the units 126, obtained by heating the units to partially expand the longitudinally oriented cells 120. FIGURE 25 similarly represents a second stage expansion, whereas FIGURE 26 represents a third stage expansion of the units to achieve a final desired form represented at 12a (see also FIGURES 27 and 28). As more particularly described in said copending application, Serial No. 765,083, the expansion is achieved in stages, with intermediate cooling or holding steps to equalize gas temperatures and pressures within the individual cells 120 with the temperature and pressure of the outside atmosphere. Sequential enlargement of the units 126 to various stages of radial expansion (as represented in FIGURES 24 to 26), is necessary to assure that the thermoplastic resin forming the cell walls will not stretch to such an extent that it is unable to support the partial vacuum formed within the cells 120 during the heat expansion. Moreover, such radial expansion facilitates formation of the desired "lifesaver" shape of the packing units, particularly shown in FIGURES 26 and 27. It should be understood that the packing units 12b in FIGURES 26 and 27 are substantially identical to the packing units 12a illustrated in FIGURE 10, except as respects the length to diameter ratio described hereinafter.

As noted previously, thermoplastic resins capable of being foamed and expanded to produce the crushable packing unit shapes herein disclosed include the alkenyl aromatic polymers (e.g., foamed and expanded polystyrene) and the aliphatic olefin polymers (e.g., foamed and expanded polyethylene, polybutylene, etc.). The first group of polymers, namely, resinous alkenyl aromatic polymers of the type disclosed for example in U.S. Patent 3,066,382, generally comprise in chemically combined form at least 70% by weight of one alkenyl aromatic compound having the general formula:

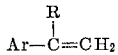

wherein "Ar" represents an aromatic hydrocarbon or a nuclear halohydrocarbon radical of the benzene series and "R" is hydrogen or the methyl radical. Examples of such alkenyl aromatic polymers are homopolymers of styrene, alphamethyl styrene, ortho-, meta-, and paramethyl styrene, Ar-ethylstyrene, and Ar-chlorostyrene; the copolymers of two or more of such alkenyl aromatic compounds with one another; and copolymers of one or more of such alkenyl aromatic compounds with minor amounts of other readily polymerizable olefinic compounds such as divinylbenzene, methylmethacrylate, or acrylonitrile, etc.

Foaming agents incorporated with the thermoplastic resins are usually gases or volatile liquids such as pentane, dichlorodifluoromethane, low boiling petroleum ethers and mixtures thereof, carbon dioxide and the like, which have been dissolved or otherwise incorporated within the thermoplastic polymer or resinous material. The usual practice is to incorporate the foaming agent as a uniform dispersion distributed throughout the resin, and in amounts sufficient to provide a very porous foam which will have the desired characteristic of crushability. In practice, the proportion of foaming agent will vary somewhat with the particular resin employed. In the case of a polystyrene resin employing a dissolved sodium bicarbonate or dichlorofluoromethane expanding agent, the proportion of expanding agent may range from about 5 to 15% by weight of the extrusion mixture. Where foaming is accomplished by direct introduction of steam of other heated gas into the extrusion outlet, as in the technique illustrated in FIGURES 8 and 9, less amounts of foaming agent may be required. In either event, the extrusion mixture can incorporate commercially available extrusion components, for example polystyrene beads, of the type disclosed in U.S. Patent 2,983,692, and sold by the Koppers Co., of Delaware, under the trademark "Dylite." Such extrusion materials customarily contain from 5 to 10% by weight of a volatile organic material such as pentane or dichlorodifluoromethane dissolved in the polymer under pressure. Various expanding agents in solid form, such as sodium bicarbonate, may also be incorporated with the extrusion mixture to insure the necessary expansion and foaming of the mixture during extrusion to achieve the foam characteristics herein described. In general, a degree of foaming sufficient to achieve a density of the foamed and expanded plastic material of the order of 0.3 to about 4.5 pounds per cubic foot, and a bulk density of a relatively compact mass of the packing units ranging from about 0.05 to about 3.0 pounds per cubic foot, is preferred.

When the plastic material employed is a resinous aliphatic olefin polymer of the type disclosed in United States Patent 3,251,728, the polymer may be obtained by polymerizing at least one alpha-mono-olefinic aliphatic hydrocarbon containing from 2 to 8 carbon atoms, such as ethylene, propylene, butene-1, pentene-1, 3-methylbutene-; 4-methylpentene-1, 4-methylhexene-1, or 5-methylhexene-1, alone, with one another or with various other polymerizable compounds. Foamed expanded polymers or ethylene or propylene alone are highly satisfactory and produce desired foam structures which are chemically inert. Polymerizable organic compounds which can be polymerized with ethylene or propylene include vinyl acetate, $C_1$–$C_4$ alkyl acrylates such as ethyl acrylate, styrene, lower alkyl esters of methacrylic acid such as methyl methacrylate, tetrafluoroethylene and acrylonitrile.

Foaming or expanding agents employed with the aliphatic olefin polymers of the type described may be selected from a wide group of normally gaseous or volatile liquids. Indicated expanding and foaming agents include nitrogen, argon, neon, helium, acetylene, ammonia, butadiene, carbon dioxide, cyclopropane, dimethylamine, 2,2-dimethylpropane, ethane, ethylamine, ethylene, isobutane, isobutylene, monomethylamine, propane, propylene, and trimethylamine, certain of the halogen derivatives of methane and ethane, such as chlorodifluoromethane, dichlorodifluoromethane, dichlorofluoromethane, trichlorofluoromethane, difluorotetrachloroethane, difluorochloroethane, 1,1-difluoroethane, trichlorofluoromethane, and particularly 1,1-dichlorotetrafluoroethane and 1,2-dichlorotetrafluoroethane. The dichlorotetrafluoroethanes have been found to be particularly effective as foaming agents for making foamed bodies from normally solid aliphatic olefin polymers when employed in accordance with the present invention is amounts to about 0.2 to 1.0% by weight of the aliphatic olefin polymers. Where greater reliance is placed on the foaming by hot gases as in the extrusion technique disclosed in FIGURES 8 and 9, lesser amounts of chemical expanding or foaming agents may be employed. Again the precise amount of expanding or foaming agent employed will depend in large measure on the particular aliphatic olefin polymer used in the extrusion process. The conditions of foaming should be controlled as before, to achieve a desired density of the expanded foamed polymer between about 0.3 and 4.5 pounds per cubic foot, and a bulk density of the compacted packing mass ranging from about 0.05 to 3.0 pounds per cubic foot. In general, among the aliphatic olefin polymers, foamed expanded polyethylene and polypropylene resins based on initial resins of molecular weight 250 to 400,000 are to be preferred.

The description has so far related to the method of producing the foamed expanded packing units by extrusion of thermoplastic materials. In accordance with the present invention it is also possible to form packing units having desired characteristics by molding or otherwise forming the foamed expanded units from thermosetting resins. The polyurethane foams are especially adaptable to such use since they are capable of being molded to any desired shape, without great heat or pressure, and are simply and inexpensively handled during the molding. The polyurethanes are also highly adaptable to different methods of foaming so that the desired degree of porosity (i.e., proportion of gas cells within the foam) can easily be obtained to provide the desired characteristic of crushability. Although the foamed polyurethanes constitute a relatively new development in the field of plastics, considerable practical or empirical knowledge has been attained so that vast quantities of the polyurethane products are now sold annually.

In a strict chemical sense, a polyurethane results from the reaction of a simple di- or polyhydric alcohol with a di- or polyisocyanate, wherein the only repeating linkage present in the polymer chain is the urethane group indicated below:

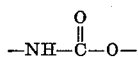

However, the commercial "polyurethanes" are complex reaction products of di-isocyanates and hydroxyl-bearing polyester or polyether resins and, as such, are more correctly described as poly(ester)urethanes and poly(ether) urethanes, respectively. Since the present invention can be satisfactorily practiced with foams of both the poly-(ester)urethane or poly(ether)urethane type, the term "polyurethane" is used herein in this broad general sense. From a practical point of view, packing units having the desired characteristics of crushability are more easily produced from highly branched poly(ester)urethanes which produce more rigid or stiffer foams.

To formulate a polyurethane foam for molding or forming into the improved packing materials described herein, a polyether such as propylene glycol or a propylene oxide derivative of glycerol or sorbitol, or similar material is treated with a di-isocyanate in the presence of some water and a catalyst (amines, tin soaps, organic tin compounds). Simultaneously with the polymer-forming reactions, the water reacts with the isocyanate groups to cause cross linking and curing, and also produces carbon dioxide which causes foaming. Preferably, trichlorofluoromethane or a similar volatile material is incorporated to serve as a blowing agent, and to reduce the thermal conductivity of the finished foam.

To make the hollow cylindrical crushable packing units 12 with the foamed polyurethane, the foam may be introduced into suitable molds adapted to commercial production. For example, semicylindrical units may be formed and joined to mating units to form hollow cylindrical units, as illustrated at 62 and 64 in FIGURES 11 and 12. The semicylindrical components (66 and 68 in FIGURE 11) may be formed in sheets which may then be bonded to one another in any suitable manner (i.e., by heat bonding, adhesives, etc.) to form open hollow tubes. The sheets may then be severed to form cylindrical strips, which can be cut to the desired packing unit length by any suitable mechanism. By molding foamed sheets wherein the semicylindrical segments are of different diameter, units of the type shown in FIGURE 12 may also be formed. In the latter case, the diameter of the semicylindrical portion 70 is somewhat smaller than the diameter of units 72, and preferably has an external diameter close to the internal diameter of the portion 72. In either case, the units may be joined to one another to provide protuberances or projections, represented at 74 in FIGURES 11 and 12, which provide a desired interlocking effect.

In preparing the polyurethane foams, the degree of porosity and cell size is controlled by the amount of the blowing agent (i.e., water and/or trichlorofluoromethane) added to the resin, and by the types and amounts of surfactants (i.e., sulfonated castor oil, sulfonated fatty acids and other ionic surfactants) and nonionic cell stabilizers (silicone oils and silanopolyol copolymers) employed. In general, and within certain limits, the greater the amount of surfactant or cell stabilizer, the finer and more uniform the cell. The porosity and cell size within the plastic foam can also be controlled to some extent by the degree of loading of the mold with respect to either the amount of resin employed or the amount of various reinforcing fillers being employed. It is also possible to vary the formulation of the units to control the foam characteristics as respects density and stiffness. Such characteristic in a flexible foam may be determined by "Shore" scleroscope hardness (i.e., employing the standard technique according to the American Rubber Manufacturers Association). In the polyurethane resins Shore hardness is controlled principally by the choice of resin, isocyanate and curing and blowing agents. By way of illustration, use of trichlorofluoromethane as an auxiliary blowing agent will yield a softer foam than one blown with water alone to the same density.

In formulating the polyurethane foams to produce packing units by the technique described above, a certain degree of frothing or porosity can be achieved by mechanical agitation of the foam coupled with chemical frothing and expansion with blowing agents of the type described. When a foam having desired characteristics is obtained, it is loaded into a mold and cured in the form of rigid units having the normally shape-retaining but crushable characteristic hereinabove described.

In general, foamed cylindrical packing units are made with the polyurethane foams by pouring into a mold cavity suitably designed for the purposes of the invention. By way of illustration, the mold cavity can be designed to produce the "lifesaver" or ring-like form of packing unit shown in FIGURES 26 and 27. In such case, the ingredients to form the polyurethane foam are introduced into the mold cavity where the composition subsequently expands to form a foamed product of the desired shape and configuration. Alternatively, the mold cavity can be designed to produce a hollow tubular foamed configuration, with the product being subsequently cut to produce severed units of desired length as represented for example at 12a in FIGURE 10 or 12b in 27. In this regard, the packing units illustrated in FIGURES 10 and 27 are representative of the packing materials which may be obtained from either thermoplastic or thermosetting resins, in accordance with the techniques herein disclosed. By way of illustration, the packing units 12a could be formed of thermoplastic resins by the procedure of FIGURE 23, through use of a slightly slower rate of rotation of the cutters 122. In like fashion, packing units of substantially longer lengths, as respects diameter could be obtained by still slower rates of rotation of the cutters 122, in the continuous processing illustrated.

FIGURE 5 illustrates a typical packing operation employing packing units formed of either foamed expanded thermoplastic resins or thermosetting resins. In the illustrated operation, a quantity of the cylinders 12 is being poured from a container 84 into a shipping carton 86. In practice, the packing material is poured all around and within hollow openings of the particular item (represented in FIGURE 5 as a delicate klystron tube 88) being packed. The free flowing characteristic of the packing material makes it readily adaptable to high-speed machine-type packing operations such as might be used on a production line in the packing of large quantities of items of the type illustrated. The characteristic pourability of the packing material is also of equal value in the rapid, efficient packing of shipping cartons by hand, particularly as no special skills are required in the performance of the packing operation.

In a commercial use of the packing material, it has been determined that the desired properties of initial noncollapsibility, pourability and crushability as respects the cylindrical shapes can be obtained when the individual packing units have a ratio of length to diameter within the range from about 1:8 to about 8:1. A particularly satisfactory form of packing unit, illustrated in FIGURES 26 and 27, has an average maximum cross-sectional dimension within the range from about ⅛ to 1¼ inch, and a length to cross-sectional ratio of about 1:6. In contrast the packing units of FIGURES 10 and 11 have length to diameter ratios of the order of 1:2 and 2:1, respectively. If the ratio of length to diameter is increased beyond about 8:1, the length of the units may cause an undesirable matting or self-packing of the packing material. On the other hand, because of the inherent crushability of the expanded foam material, the ratio of length to cross sectional dimension may be reduced to as low as 1:8, or less, without adversely affecting the desired internal crushability of the packing material. However, lengths below this ratio may reduce the crushability of the packing mass to a point where its capacity to absorb impact or shock is undesirably impaired.

In using the foamed expanded packing material of the invention, the carton is first filled with a quantity of the material to provide an adequate thickness in the bottom of the container, as illustrated at 10 in FIGURE 6. Thereafter the item is positioned in the carton and the packing material poured about the sides, within and on top of the item to isolate it from the walls of the carton. The carton 86 is packed with an excess of material (e.g., 3 to 10%) so that the packing mass is pressure loaded to some extent upon sealing of the carton. The effect is to increase the interlocking provided by frictional contact and engagement of the projections and concavities of preferred packing shapes. Interlocking of the type described tends to maintain the isolated position of the packed item by increasing resistance to migration of the packed item through the packing mass.

FIGURE 7 illustrates the conditions as they might actually exist during shipment of the item, with the lines 90 indicating vibration of the carton on the floor 92 of a transporting vehicle. Under such conditions, resistance to migration is continuously provided by the interlocking of the units 10 and by a certain amount of deformation and compacting of the foamed expanded units, as generally indicated at 94. Any sharp blows which might be transmitted to the carton will likewise be absorbed by the mass due to crushing or deforming of the hollow cylindrical shapes and of the foamed expanded plastic material itself. As noted previously, the high degree of shock absorption of the packing material of the invention results in part from the deformation or collapse of the cylindrical units and, in an important degree, from the deformation or compaction of the foamed expanded plastic material which forms the walls of the cylindrical units. The net result, as illustrated at 96, is a substantial absorption of the shock due to the combined deformations of the packing mass.

From the above description it will be evident that the present invention makes possible a highly effective, efficient packing of a wide variety of delicate items, and because of the unusual nature of the packing material, is capable of providing almost complete protection of the most sensitive equipment from injurious effects of shocks, impact, and vibration. The invention is particularly adapted to the packing of items and components of electronic and optical equipment, for example, timers, meters, binoculars, lenses, radio tubes, etc., as well as various other items. The improved packing material has proved effective in the protection of items of a delicate nature which may be rendered useless because of a change in position, alignment, or adjustment of the parts. Under normal shipping conditions, such changes can occur due to constant vibration of the item against the wall of the container without any visible breakage occurring. Because the packing material of the present invention provides a greater shock absorbing characteristic than any similar packing material used heretofore, its utility for shipments involving difficult conditions or rough handling is readily apparent.

We claim:

1. A free flowing packing material of low bulk density and enhanced resistance to shock, vibration and impact, comprising a loose, pourable substantially shape-retaining mass of crushable cylinders, each of said cylinders being formed of a foamed substantially rigid expanded plastic material possessing sufficient internal strength to retain the foamed expanded characteristic during normal handling but capable of substantial crushing in response to an external force, each of said cylinders additionally being formed as open substantially hollow units adapted structurally to retaining the cylindrical shape during said normal handling but likewise capable of substantial crushing in response to said external force, the foamed expanded characteristic of said plastic material cooperating with the open substantially hollow configuration of the cylinders to impart a maximum degree of localized crushing and shock absorption per unit of weight in the zone of application of said external force.

2. A free flowing packing material as in claim 1 wherein said foamed expanded plastic is selected from the group of polymers consisting of alkenyl aromatic polymers, aliphatic olefin polymers, and polyurethane polymers.

3. A free flowing packing material as in claim 1 wherein said foamed expanded plastic material has a density of the order of 0.3 to 4.5 pounds per cubic foot.

4. A free flowing packing material as in claim 1 wherein said plastic material is characterized, at least in part, by a substantially intercommunicating cell structure.

5. A free flowing packing material as in claim 1 wherein said plastic material is characterized, at least in part, by a substantially unicellular foam structure.

6. A free flowing packing material of low bulk density and enhanced resistance to shock, vibration and impact, comprising a loose, pourable, substantially shape-retaining mass of crushable cylinders, each of said cylinders being formed of a plastic material which has been foamed and expanded to provide an average density of the order of 0.3 to 4.5 pounds per cubic foot, said foamed expanded plastic material being substantially rigid and possessing sufficient internal strength to retain the rigid, foamed expanded characteristic during normal handling but insufficient to prevent substantial crushing in response to an abnormal external force, each of said cylinders additionally being formed as open, substantially hollow units adapted to structurally retaining the cylindrical shape during normal handling but likewise capable of substantially crushing in response to such external force, at least some of the open hollow portions of said cylinders facing outwardly so as to insure a degree of interlocking of said cylinders with others of said cylinders, whereby an enhanced resistance to forces induced by shock, vibration and impact and to migration of articles retained within the packing material is obtained.

7. A free flowing packing material as in claim 6 wherein the maximum cross sectional dimension of said cylinders is within the range from about ⅛ inch to about 1¼ inch.

8. A free flowing packing material as in claim 6 wherein the ratio of length of said cylinders to their maximum cross sectional dimension is no greater than about 8:1.

9. A free flowing packing material as in claim 8 wherein the ratio of length of said cylinders to said cross sectional dimension is between about 1:8 and 8:1.

10. A free-flow packing material as in claim 6 wherein said cyliders are open hollow annuli having a ratio of length to cross sectional dimension of the order of about 1:6.

11. A free flowing packing material of low bulk density and enhanced resistance to shock, comprising a loose, pourable, substantially shape-retaining mass of crushable cylinders, each of said cylinders being formed of a foamed, substantially rigid expanded plastic material, the void spaces of said foamed plastic material being composed of substantially individualized cells of a size ranging from about 0.001 to 0.1 inch, the void space represented by said cells constituting between 25 and 85% of the total volume of said plastic material, the density of said plastic material ranging from about 0.3 to about 4.5 pounds per cubic foot, said plastic material and cylinders possessing sufficient internal and structural strength to retain the foamed expanded characteristic and shape during normal handling but insufficient to resist substantial crushing in response to an abnormal external force.

12. A free flowing packing material as in claim 11 wherein said cells are substantially unicellular.

13. A free flowing packing material as in claim 11 wherein said cells are substantially intercommunicating.

14. A free flowing packing material as in claim 11 wherein said foamed expanded plastic material contains a finely divided inorganic reinforcing filler dispersed throughout said plastic material.

15. In an article of manufacture, a shipping carton for frangible items, such carton and the hollow spaces within a shipped item being filled with a loose pourable substantially shape-retaining mass of crushable cylinders, each of said cylinders being formed of a foamed substantially rigid expanded plastic material possessing sufficient internal strength to retain the foamed expanded characteristic during normal handling of the shipping carton but insufficient to resist substantial crushing in response to abnormal external forces applied to said shipping carton, each of said cylinders being additionally formed as open, substantially hollow units adapted structurally to retaining the cylindrical shape during normal handling but likewise capable of substantial crushing in response to said external forces, the foamed expanded characteristic of said plastic material cooperating with the open, substantially hollow configuration of the cylinders to impart a maximum absorption of shocks and impacts resulting from said external forces while insuring a minimum degree of migration of said packed item through the packing material in response to continuing applications of said external forces.

16. An article of manufacture as in claim 15 wherein said foamed expanded plastic cylinders are formed as open hollow annuli having a ratio of length to cross sectional dimension of the order of about 1:6.

17. In a method for manufacturing free flow packing materials of low bulk density from plastic materials, the steps of heating the plastic material to a liquid state, agitating the liquid plastic material to mechanically incorporate gas bubbles therein and expanding the softened plastic material by means of chemical blowing agents to thereby produce a foamed expanded plastic material in which the void space in the form of mechanically and chemically introduced gas cells constitutes between 25 to 85% of the total volume of the plastic material, and thereafter forming the foamed expanded plastic material into rigid substantially shape-retaining but crushable cylinders.

18. A method as in claim 17 wherein said plastic material is formed into cylindrical shapes while in a heat softened state, the cylindrical shapes are cooled to a rigid state and subdivided longitudinally to form rigid substantially shape-retaining cylindrical unit.

19. A method as in claim 17 wherein said plastic material is subdivided into separate portions of a cylindrical shape, the separate portions are set to a rigid substantially shape-retaining state, the separate portions bonded to one another and subdivided longitudinally to form a rigid substantially shape-retaining cylindrical units.

References Cited

UNITED STATES PATENTS

| | | | |
|---|---|---|---|
| 2,955,056 | 10/1960 | Knox. | |
| 3,066,382 | 12/1962 | Zweigle et al. | 206—46 |
| 3,074,543 | 1/1963 | Stanley | 206—46 |
| 3,188,464 | 6/1965 | Holden | 206—46 |
| 3,251,728 | 5/1966 | Humbert et al. | 206—46 |
| 3,400,037 | 9/1968 | Sare et al. | 161—42 |

FOREIGN PATENTS 966,623   8/1964   Great Britain.

WILLIAM T. DIXSON, JR., Primary Exmainer

U.S. Cl. X.R.

161—168; 217—53; 229—14; 264—41, 50, 54, 148